(12) United States Patent
Miller

(10) Patent No.: US 9,668,500 B2
(45) Date of Patent: Jun. 6, 2017

(54) FEEDING METHODS AND SYSTEMS FOR YOUNG LIVESTOCK ANIMALS USING SENSORY COMPOUNDS

(71) Applicant: PURINA ANIMAL NUTRITION LLC, Shoreview, MN (US)

(72) Inventor: Bill L. Miller, Labadie, MO (US)

(73) Assignee: PURINA ANIMAL NUTRITION LLC, Shoreview, MN (US)

(*) Notice: Subject to any disclaimer, the term of this patent is extended or adjusted under 35 U.S.C. 154(b) by 799 days.

(21) Appl. No.: 13/837,693

(22) Filed: Mar. 15, 2013

(65) Prior Publication Data

US 2013/0280369 A1    Oct. 24, 2013

Related U.S. Application Data

(60) Provisional application No. 61/637,437, filed on Apr. 24, 2012.

(51) Int. Cl.

| | | |
|---|---|---|
| A23K 1/16 | (2006.01) |
| A23K 20/158 | (2016.01) |
| A23K 20/10 | (2016.01) |
| A23K 50/10 | (2016.01) |
| A23K 50/30 | (2016.01) |
| A23K 50/60 | (2016.01) |

(52) U.S. Cl.
CPC ............ *A23K 1/1646* (2013.01); *A23K 20/10* (2016.05); *A23K 20/158* (2016.05); *A23K 50/10* (2016.05); *A23K 50/30* (2016.05); *A23K 50/60* (2016.05)

(58) Field of Classification Search
CPC .... A23K 1/1646; A23K 1/184; A23K 1/1893; A23K 1/1813; A23K 1/164; A23K 20/10; A23K 10/18; A23K 10/30; A23K 50/60; A23K 50/80; A23K 20/121; A23K 21/10; A23K 20/137; A23L 33/11; A23L 7/152; A23L 7/3319; A23L 33/21; A23L 33/30
USPC .......................................................... 426/2
See application file for complete search history.

(56) References Cited

U.S. PATENT DOCUMENTS

| | | |
|---|---|---|
| 2,125,398 A | 8/1938 | Reichert et al. |
| 4,378,376 A | 3/1983 | Wagner |
| 4,617,190 A | 10/1986 | Montgomery |
| 4,961,934 A | 10/1990 | Iwasaki et al. |
| 5,085,873 A | 2/1992 | Degre |
| 5,580,592 A | 12/1996 | Nassauer et al. |
| 5,607,681 A | 3/1997 | Galley et al. |
| 5,668,299 A | 9/1997 | Debonte et al. |
| 5,747,078 A | 5/1998 | De Jong et al. |
| 5,756,132 A | 5/1998 | Rebhan |
| 5,785,990 A | 7/1998 | Langrehr |
| 5,792,501 A | 8/1998 | Lepine |
| 5,795,602 A | 8/1998 | Craig |
| 6,348,223 B1 | 2/2002 | Claycamp |
| 6,541,047 B1 | 4/2003 | Claycamp et al. |
| 7,709,033 B2 | 5/2010 | Kvist et al. |
| RE43,929 E | 1/2013 | Miller |
| 8,349,313 B2 | 1/2013 | Smith et al. |
| 2002/0018828 A1 | 2/2002 | Lepine |
| 2002/0119136 A1 | 8/2002 | Johansen |
| 2005/0171367 A1 | 8/2005 | Deloach |
| 2006/0159728 A1 | 7/2006 | Miller |
| 2006/0289354 A1 | 12/2006 | Zhou et al. |
| 2007/0134369 A1 | 6/2007 | Mazeris |
| 2007/0203802 A1 | 8/2007 | Medo |
| 2008/0026036 A1 | 1/2008 | Miller et al. |
| 2008/0026101 A1 | 1/2008 | Nickel et al. |
| 2008/0118615 A1 | 5/2008 | Hartmann et al. |
| 2009/0253790 A1 | 10/2009 | Smith et al. |
| 2009/0317378 A1 | 12/2009 | Perraudin |
| 2010/0221386 A1 | 9/2010 | Buysse et al. |
| 2010/0278967 A1 | 11/2010 | Cresp |
| 2011/0229598 A1 | 9/2011 | Musser |

(Continued)

FOREIGN PATENT DOCUMENTS

| | | |
|---|---|---|
| CA | 2323581 | 10/1999 |
| CH | EP 1815754 A1 * | 8/2007 ........... A23K 1/1612 |

(Continued)

OTHER PUBLICATIONS

"Nursing Formula Select". Available online at www.masterfeeds.com on Sep. 2, 2011.*
International Search Report and Written Opinion dated Sep. 23, 2015 for PCT Application No. PCT/US2015/038612.
"Milk Balancer Can Help When Feeding Wasting Milk", DairyBusiness East, Feb. 2015, p. 12, www.dairybusiness.com.
"A Guide to Calf Milk Replacers—Types, Use and Quality", Bovine Alliance on Management & Nutrition, 2008.
Anonymous: "Jersey Blend—Cow's match—Calf growth formula", Jan. 1, 2004 (Jan. 1, 2004), Mar. 2013, (Mar. 2013), XP55194288, Retrieved from the Internet: URL:http://www.lolmilkreplacer.com/stellen/groups/public/documents/web_content/ecmp2-0186429.pdf.
Campbell, R. E., et al. "The use of lactoperoxidase for the bleaching of fluid whey." Journal of Dairy Science 95.6 (2012): 2882-2890.
Dumitrascu, Loredana et al. "Thermal Inactivation of Lactoperoxidase in Goat, Sheep and Bovine Milk—A Comparative Kinetic and Thermodynamic Study", Journal of Food Engineering 113 (2012) 47-52.

(Continued)

Primary Examiner — Erik Kashnikow
Assistant Examiner — Assaf Zilbering
(74) Attorney, Agent, or Firm — Dorsey & Whitney LLP; Bridget M. Hayden

(57) ABSTRACT

Methods of feeding young animals involves mixing sensory compounds containing botanicals, essential oils or both with at least one of a milk replacer and/or starter feed and providing the feed to the young animals to reduce feed refusal or intake variation. A method of reducing feed intake variation in a group of young animals includes feeding an effective amount of sensory compounds containing licorice root in at least one of a milk replacer or a starter feed to reduce feed intake variation compared to a group of young animals fed the same diet but without the sensory compounds. Reducing feed refusal in a young livestock animal may also include feeding an effective amount of sensory compounds in one or more of a milk replacer and a starter feed such that the young animal reduces feed refusal compared to a young animal fed the same diet but without the sensory compounds.

18 Claims, No Drawings

(56) References Cited

U.S. PATENT DOCUMENTS

| | | | |
|---|---|---|---|
| 2013/0280369 | A1 | 10/2013 | Miller |
| 2014/0147548 | A1 | 5/2014 | Miller et al. |

FOREIGN PATENT DOCUMENTS

| | | |
|---|---|---|
| CN | 101 049 116 A | 10/2007 |
| CN | 101 703 171 | 5/2010 |
| CN | 101 911 981 | 12/2010 |
| CN | 102 132 766 | 7/2011 |
| CN | 102805263 | 12/2012 |
| CN | 103 271 091 | 9/2013 |
| EP | 0 229 938 | 7/1987 |
| EP | 0282663 | 12/1991 |
| EP | 0642740 | 6/2001 |
| EP | 1637880 | 3/2006 |
| EP | 1 815 754 | 8/2007 |
| JP | 7089863 | 10/1995 |
| JP | 2509932 | 6/1996 |
| JP | 3145829 | 3/2001 |
| JP | 2002-544212 | 12/2002 |
| JP | 2004-236552 | 8/2004 |
| KR | 2010-0101091 | 9/2010 |
| WO | WO 00/69267 | 11/2000 |
| WO | WO 02/056879 | 7/2002 |
| WO | WO 2007/106452 | 9/2007 |
| WO | WO 2011/055387 | 5/2011 |
| WO | WO 2011/061756 | 5/2011 |
| WO | WO 2015/160818 | 10/2015 |

OTHER PUBLICATIONS

Extended European Search Report dated Jun. 26, 2015 for EP Application No. 1515943.3, 9 pages.
Fathi, M.H. et al., "The effect of vanilla flavoured calf starter on performance of Holstein calves", Journal of Animal and Feed sciences, 2009, vol. 18, pp. 412-419.
Hills R et al: "Effects of Milk Replacer Composition on Growth, Body Composition, and Nutrient Excretion in Preweaned Holstein Heifers", Journal of Dairy Science, American Dairy Science Association, US, vol. 91, No. 8, Aug. 1, 2008 (Aug. 1, 2008), pp. 3145-3155.
Jim Drackley, "Replacing Milk-Derived Proteins and Carbohydrates in Milk Replacer", University of Illinois at Urbana-Champaign, Department of Animal Sciences, May 29, 2013.
K. J. Touchette, M. L. O'Brien, and J. A. Coalson, "Liquid Egg as an Alternative Protein Source in Calf Milk Replacers", J. Dairy Sci. 86:2622-2628, 2003.
Langendijk et al., "Effects of pre- and postnatal exposure to garlic and aniseed flavour on pre- and postweaning feed intake in pigs", Livestock Science, Elsevier, Amsterdam, NL, vol. 108, No. 1-3, Apr. 29, 2007 (Apr. 29, 2007), pp. 284-287.
Luis Alberto Nabté-Solís, "Effect of β-Mannanase Enzyme Addition to Soy-Containing Milk Replacers on Growth and Health of Neonatal Dairy Calves", Thesis Presented to the Faculty of the Graduate School of Cornell University, Jan. 2009.
Montoro, C. et al., "Effect of flavoring a starter in a same manner as a milk replacer on intake and performance of calves", Animal Feed Science and Technology, Feb. 28, 2011, vol. 164, pp. 130-134.
Mullan, W.M.A. (2003). "Manufacture of milk powders containing a functional LP system." [On-line]. Available from: http://www.dairyscience.info/exploitation-of-anti-microbial-proteins/168-lactoperoxidase-system.html. Accessed: Jan. 10, 2014. Revised Aug. 2009.
New Dairy Calf Production Products that can Increase Your Profit by Milk Specialties Global Naimal Nutrition, PM Primer™, PM Balancer™, p. 83, downloaded from www.progressivedairy.com on Mar. 5, 2015.
Oostindjerm et al., "Prenatal flavor exposure affects growth, health and behavior of newly weaned piglets", Physiology and Behavior, Elsevier Science Ltd., Oxford, GB, vol. 99, No. 5, Apr. 19, 2010, pp. 579-586.

P.S. Jackett et al., "Virulence of *Mycobacterium tuberculosis* and Susceptibility to Peroxidative Killing Systems", Journal of General Microbiology (1978), 107, pp. 273-278.
Pruitt, K. M., and D. N. Kamau. "Quantitative analysis of bovine lactoperoxidase system components and of the effects of the activated system on bacterial growth and survival." *Indigenous antimicrobial agents of milk. Recent developments*, Uppsala (Sweden), Aug. 31-Sep. 1, 1993. FIL-IDF. Secretariat general, 1994.
Oostindjerm et al., "Prenatal flavor exposure affects growth, health and behavior of newly weaned piglets", Physiology and Behavior, Elsevier Science Ltd., Oxford, GB, vol. 99, No. 5, Apr. 19, 2010 (Apr. 19, 2010), pp. 579-586.
Connor Wet al. Am. J Clin. Nutr. 1999, 69: 827-828.
"Yeast Cell Wall", European Association for Specialty Yeast Products, downloaded Nov. 5, 2015, 1 page.
Barabas, J. "An alternative method of milk treatment", http://www.fao.org/ag/aga/frg/feedback/war/v6200b/v6200b0t. htm. 5 pages, Sep. 13, 1994.
Better Crops, "Phosphorus in Animal Nutrition", Better Crops/vol. 83 (1999, No. 1), pp. 32-33.
de Halleux, V. et al. 'Variability in human milk composition: benefit of individualized fortification in very-low-birth-weight infants', The American Journal of Clinical Nutrition, 2013, vol. 98(suppl), pp. 529S-535S.
Elizondo-Salazar, J.A. et al., "Pasteurization of Non-Saleable Milk", Penn State Extension, Department of Animal Science, DSE 2013-187, originally published May 2007 as DAS 07-121, updated Aug. 23, 2013.
Examination Report Dated Feb. 11, 2015 for Chilean Patent Application No. 2556-2012.
Examination Report Dated Mar. 6, 2015 for Mexican Patent Application No. MX/a/2012/010741.
Godden, S. "A review of issues surrounding the feeding of waste milk and pasteurization of waste milk and colostrum", College of Veterinary Medicine, University of Minnesota, 13 pages, Sep. 24-26, 2005.
Griffiths ed. Improving the Safety and Quality of Milk: Milk Production and Processing Woodhead Publishing Series in Food Science, Technology and Nutrition (Apr. 21, 2010), p. 295.
International Search Report and Written Opinion dated Jun. 3, 2016 for PCT Application No. PCT/US2016/021789.
International Search Report and Written Opinion dated May 12, 2016 for PCT Application No. PCT/US2016/019848.
Jorgensen, M. et al., "On-Farm Pasteurization of Milk for Calves", University of Wisconsin Dail)'Update, Dail)' Team Extension, pp. 1-3, Mar. 31, 2005.
JP 2002-544212-A, Dec. 24, 2002, English machine translation.
Manual on the Use of the LP-System in Milk Handling and Preservation, 1999, pp. 1-4.
mM vs ppm retrieved from Internet, Jun. 2016.
Moore D. A. et al. 'Quality assessments of waste milk at a calf ranch', J. Dairy Sci. 2009, vol. 92, pp. 3503-3509.
Riley et al. entitled "Penetration of hydrogen peroxide from contact lenses or tear-side solution into the aqueous humor". in Optom Vis Sci. 68:7,546-551, 1991.
Rochow, N. et al., 'Target Fortification of Breast Milk with Fat, Protein, and Carbohydrates for Preterrn Infants', The Journal of Pediatrics, 2013, vol. 163, No. 4, pp. I 001-1007.
Rudolph, Bryan, "Phytase use in pig feed: a real profitability boost", Allaboutfeed vol. 22, No. 8, 2014, pp. 22-24, Oct. 2014.
Russell NJ et al. in Food Preservatives ISBN 0-306-47736-X (2003).
Sebastian, S. et al., "Apparent Digestibility of Protein and Amino Acids in Broiler Chickens Fed a Corn-Soybean Diet Supplemented with Microbial Phytase", Department of Animal Science, Macdonald Campus of McGill University, Dec. 1997;76(12): 1760-9.
Selia, Jane and Jose A. Teixeira, Engineering Aspects of Milk and Dariy Products, CRC Press, 2010, pp. 222.
Smith, Daniel L., Jr., et al. "The Effect of Mannan Oligosaccharide Supplementation on Body Weight Gain and Fat Accrual in C57Bl/6J Mice", Obesity (Silver Spring), May 2010, 18(5): 995-999, doi:10.1038/oby.2009.308.

(56) References Cited

OTHER PUBLICATIONS

Stone, Bill, "Waste milk, milk replacer or pasteurized waste milk", The Manager, Jun. 2004.
Yang et al. (Study on the Colostrum Preservation of Milk Cows by Utilizing the Lactoperoxidase System (May 2007, abstract) Guizhou Agricultural Sciences, May 2007 accessed Dec. 28, 2013.

* cited by examiner

FEEDING METHODS AND SYSTEMS FOR YOUNG LIVESTOCK ANIMALS USING SENSORY COMPOUNDS

TECHNICAL FIELD

Feeding methods and systems provide sensory compounds such as botanicals and essential oils to young animals. Particularly, sensory compounds may reduce feed refusal and variation in feed intake in young livestock animals, which may result in a more consistent consumption of energy and protein and may increase growth.

BACKGROUND

Livestock animals are typically considered a commodity and are raised to produce food products including milk and beef. The time it takes livestock animals to mature, particularly to gain weight, is important when assessing whether the animal is ready to produce milk or is ready for market. A number of feeding systems have been used to enhance weight gain of livestock animals, and may include feeding techniques prior to and after weaning. Such techniques may involve providing supplements and additives to milk replacer or calf starter, which may include vitamins or medications. This may, for example, reduce the age of a dairy cow at freshening and the onset of lactation, thereby reducing the cost of milk production. Increased weight gain of the livestock animal from an early age may also reduce the cost of beef production.

Therefore, a concern for producers is whether the livestock animals are receiving adequate nutrients. When the livestock animals refuse feed, intake is decreased, which may be problematic from both the standpoint of the health of the animal and to the cost of milk or beef production. Differences in feed intake by animals impact rate of weight gain and ultimately body size. Smaller animals are more difficult to adequately manage due to their specific housing, dietary and husbandry needs.

Although various feeding systems have been practiced to enhance weight gain, these feeding systems, as well as feeding techniques that employ these feed systems, have not optimized methods for increasing the rate and uniformity of weight gain by the livestock animals. Accordingly, producers are in need of new approaches to feeding livestock animals that enhance weight gain rates in ruminants and/or increase the feed efficiency of ruminants.

SUMMARY

Feeding systems for young livestock animals, such as calves, combine sensory compounds, e.g., including botanicals and essential oils, with milk replacers, starter feeds, or both. It has been found that the sensory compounds reduce feed refusal and enhance uniformity of feed intake, which may thereby provide nutritional and health benefits to the young animals.

In one implementation, a method of feeding a young animal involves mixing sensory compounds with at least one of a milk replacer or a starter feed, where the sensory compounds include at least one of a botanical product or an essential oil. The mixture is provided to the young animal such that the animal consumes at least about 0.17 grams of the sensory compounds per feeding and the animal reduces feed refusal of the at least one of the milk replacer or the starter feed.

In another implementation, reducing feed variation in a group of young animals involves feeding the group of young animals an effective amount of sensory compounds that includes a licorice root sensory compound, which is contained in a milk replacer and/or a starter feed such that the young animals reduce feed variation compared to a group of young animals fed the milk replacer and/or the starter feed but without the sensory compounds.

In yet another implementation, reducing feed refusal in a young livestock animal involves feeding the young animal an effective amount of sensory compounds including a botanical product and/or an essential oil in a milk replacer and/or a starter feed such that the young animal reduces feed refusal compared to a young animal fed the milk replacer and/or the starter feed but without the sensory compounds.

DETAILED DESCRIPTION

Implementations provide milk replacers and starter feeds combined with sensory compounds that may result in reduced feed refusal and enhanced uniformity of feed intake in young livestock animals. Generally, a fixed amount of milk replacer is offered to the livestock animal per day during a milk feeding phase and during a weaning phase. Some livestock animals do not ingest the full quantity of this fixed, offered amount. This may lead to health problems and a lower rate of weight gain. Depending on the severity of feed refusal, the livestock animal may potentially experience weight loss or death. Further, because young animals are offered fixed amounts of feed on a daily basis, the time to recover from nutrient loss may take longer compared to mature livestock animals having ad libitum access to feed (e.g., grasses and forage). Variation in animal growth caused by any reason can negatively impact optimal use of facilities and livestock management skills. More uniform intake of nutrients across the group of animals, reduces variation in growth, and thus enhances management's ability to provide for livestock animals.

Reduced feed refusal in young animals is important for several reasons. For example, with reduced feed refusal, the animal exhibits a more consistent consumption of energy and protein. These nutrients support maintenance, immune function and growth. For this reason, intake is important during the first several weeks of life. Another reason reduced feed refusal is desirable is that the growth of weaning and recently weaned animals is important for the overall growth and development of the animal. Thus, it becomes important for producers to ensure the livestock animals reduce their feed refusal throughout the first several weeks of life, and particularly during weaning and shortly after weaning. Also with reduced feed refusal, less feed may lose condition and require disposal.

It has been discovered that young livestock animals fed sensory compounds in milk replacers and dry feed exhibit reduced feed refusal, resulting in an increased weight gain compared to livestock animals ingesting the same feed but without the sensory compounds. In addition, the reduced refusal may result in enhanced consistency of feed intake across the group of animals.

Sensory compounds as used herein may provide one or more of flavors, odors and textures imparted by botanical products, essential oils and other sensory inducing components. For example, the sensory compounds may be formed of a mixture of one or more of botanical products; essential oils; herbs; spices; extracts; and natural flavors. Botanical products may be concentrated or isolated substance obtained from one or more plants and may have the odor and taste of the plant from which the botanical product is derived. Essential oils may be natural oils, such as volatile oils containing terpenes, obtained by distillation and may have the characteristic odor, flavor or both, of the plant or other source from which the oil is derived. Extracts, such as vanilla extract, may be included as a flavor and/or an odor compound or the compound may be the raw material from which the extract is derived. In some implementations, Davana oil; witch-hazel extracts (e.g., *Hamamelis virginiana*); Juglans oil (e.g., walnut oil); Quercus cortex (oak); and *Vanille planfolia* (e.g., vanilla) oils and extracts or combinations thereof may be included in the sensory compounds. In some implementations, the sensory compounds may include peptides.

According to exemplary embodiments of the present disclosure, licorice, anise, or fennel, or combinations thereof, may provide a primary or active ingredient in the sensory compounds. In some implementations, the primary ingredient may account for 60 to 100 percent of the sensory compounds, and preferably at least about 85 percent. In addition, other active ingredients may account for the balance of the sensory compounds and can include vanilla, vanillin, Fiori di Sicilia, maple, cinnamon, cassia, mint, spearmint, wintergreen, cumin, thyme, caraway, caraway thyme, coriander, hyperici (e.g., St. John's wort), caproic acid (n-hexanoic acid), caprylic acid, capric acid, 1,4-octanolactone, and butyric acid in various combinations. For example, the active ingredients may include, but are not limited to, a combination of licorice root and vanillin sensory compounds or substantial flavor equivalents (e.g., anise or fennel may be a flavor equivalent to licorice root; and vanilla, Fiori di Sicilia or maple may be equivalent to vanillin). In addition, constituent essential oils found in the aforementioned sensory compounds may be used. For example, carvone and/or limonene essential oils are constituent essential oils to caraway, and may be included in the sensory compound mixture. Further, other flavorants produced to mimic the aforementioned sensory compound components are contemplated in accordance with the present disclosure. The sensory compounds may be provided in any form such as liquid (e.g., oil) or dry (e.g., powder) form.

Sensory compounds may account for about 0.05 to about 0.20 weight percent or more of the total weight of the feed offered to the animal, the total weight of the milk replacer offered to the animal or the total weight dry feed offered to the animal. In some implementations, sensory compounds in the animal feed may be offered or ingested by the young animal at a rate of about 0.025 to about 11.50 grams per day per animal. In some implementations, sensory compounds may be ingested by the livestock animals in milk replacer at a rate of about 0.17 grams per day; about 0.34 grams per day; about 0.68 grams per day; about 2.25 grams per day; and up to about 11.50 grams per day. In further implementations, sensory compounds may be ingested by the animals in a range from about 0.17 to about 11.50 grams per day; or may range from about 0.17 grams per day to about 2.25 grams per day. When sensory compounds are ingested by the young animal in dry feed, sensory compounds may be ingested at a rate of about 0.025 grams per day up to about 2.64 grams per day; or at a rate of about 0.025 grams per day up to about 5.30 grams per day. When sensory compounds are ingested by the young animal in both milk replacers and dry feed, sensory compounds may be ingested from about to about 0.20 grams per day up to about 16.8 grams per day. The amount of sensory compounds fed to the animal may be divided based on the number of feedings the animal receives per day. For example, when the animal is fed milk replacer twice per day and receives a daily amount of sensory compounds at a rate of about 0.34 grams per day, the animal may receive about 0.17 grams of sensory compounds per feeding.

The types of feed that may be mixed with the sensory compounds according to the implementations provided herein may include milk replacers including traditional milk replacers and alternative protein milk replacers as well as dry feed such as starter feed. The milk replacers may include about, at least about or up to about 10 percent fat; about, at least about or up to about 15 percent fat; between about 10 percent fat and about 15 percent fat; up to about 20 percent fat; or up to about 30 percent fat. Protein in the milk replacer may be about, at least about or up to about 20 percent protein; about, at least about or up to about 25 percent protein; or between about 20 percent and 25 percent or 30 percent protein. Alternative protein milk replacers (e.g., non-milk protein milk replacers) may contain soy protein. The sensory compounds may be added to the dry, powdered milk replacer and hydrated with water.

In additional or alternative implementations, dry feed such as starter feed may be mixed with the sensory compounds. Starter feeds generally include protein sources at about 18 to about 22 weight percent of the total weight of the feed. In some implementations, the starter feed that may include the sensory compound may include a mixture of one or more of corn; soybean meal; wheat middlings; oats; molasses; fat; ground cotton seed hulls; distillers grains; calcium carbonate; salt; and macronutrients and micronutrients. The starter feed may include about 0.05 up to about 0.5 weight percent of sensory compounds along with about 45 to 50 percent coarse ingredients (e.g., corn, soy and oats); about 20 percent protein; about 2 to 3 percent fat; about 5 to 6 percent fiber (determined on a NIR basis); about 7 percent acid detergent fiber; about 6 percent molasses; and the balance including a mixture of other nutrients.

In some implementations, the young livestock animal may receive the sensory compounds during one of more of a milk feeding phase, a dry feed phase and a weaning phase. The milk feeding phase ("MFP") is the period when milk replacer, whole milk or a combination of milk and milk replacer is fed to the young animal. Dry feed may be fed during the MFP, however, the dry feed phase is the time period after the MFP when only dry feed (e.g., starter feed) is fed. Typically, the last week of the MFP is the weaning phase, which is the period when young livestock are encouraged to consume only dry feed. The MFP may correspond to the first 42 to 49 days from birth with the weaning phase comprising a portion of this period, described below. The dry feed phase comprised of starter feeding may last from about 42 days to about 84 days from birth.

As set forth above, the sensory compound-supplemented milk replacer may be offered to the young animal during the MFP or portions thereof (e.g., prior to or during the weaning phase). In some implementations, the milk replacer mixed with sensory compounds may be fed at a rate of 1.5 pounds per day (e.g., 0.75 pounds per feeding) on a dry weight basis. This amount may be fed during the MFP, and at a rate of 0.75 pounds per day (e.g., at a single feeding) for example during the weaning phase. In additional or alternative implementations, milk replacer may be provided at about 1.8 pounds per day on a dry weight basis for an initial time period of the MFP lasting about 7 days, about 2.5 pounds per day on a dry weight basis for a next time period of the MFP extending from days 8 to 42 thereafter, and about 1.25 pounds per day on a dry weight basis for a further time period extending from days 43 to 49, such as during the weaning phase.

During all or a portion of the time the animal receives milk replacer, the animals may be offered dry feed.

During the weaning phase, e.g., during the last several days of the milk feeding phase, sensory compounds may be provided in the feed provided to the young livestock animal. The weaning phase may be about 7 days long; about 14 days long; between about 7 and about 14 days; or for any integer-bounded time range falling between 1 day and 14 days in length. For example, during the weaning phase, the animal may ingest sensory compounds in milk replacer at a rate of about 0.17 grams per day to about 5.75 grams per day. This may be a reduced rate compared to the about 0.34 to the about 11.50 grams per day that may be provided during a first portion of the MFP described above, and the reduced rate may correspond to a reduced level of milk replacer offered to the animal during weaning. For example, the young livestock animal may transition from a diet of liquid feed (e.g., calf milk replacer) to a diet of dry feed (e.g., calf starter) and may receive a single feeding of the liquid feed with added sensory compounds per day. In this example, the animal may ingest the same amount of sensory compounds per feeding of milk replacer as the first time period, but receives only one feeding per day. During the weaning phase, in another example, the animal may ingest sensory compounds in dry feed, alone or in combination with sensory compounds in milk replacer.

In some implementations, dry feed combined with sensory compounds may be offered to the young livestock animal for one or more of at least a portion of the MFP, throughout the MFP including the weaning period, and during the dry feed phase. In some cases, the young animal may be expected to ingest an increasing amount of dry feed during the MFP or during the weaning phase portion of the MFP, and may be offered increasing amounts of dry feed during the transition from a milk replacer diet to a starter diet. In some implementations, during the MFP, the young animal may ingest sensory compounds only in the milk replacer or only in the dry feed. In further implementations, during the dry feed phase, the young animal may ingest only dry feed with sensory compounds mixed therein.

By feeding young livestock animals sensory compounds in combination with the milk replacers (e.g., both traditional and alternative protein); sensory compounds in combination with starters (e.g., dry feed formulated for animals transitioning from weaning to a dry matter diet); or both, the animals may reduce feed refusal and intake variation of the milk replacer, dry matter or both, respectively. In addition, with respect to milk replacers, feed refusals and feed intake variation may be reduced at different feeding rates, e.g., at the 1.5/0.75 pound per day rate and at the 1.8/2.5/1.25 pound per day rate described above. With respect to starters, sensory compounds added to starter feed, such as calf starter, may result in reduced feed refusal and feed intake variation.

In some implementations, feeding sensory compounds with milk replacers may result in reduced feed refusal and feed intake variation of milk replacers compared to other young animals (i.e., young animals of a similar age, starting weight and frame size as the animal ingesting sensory compounds) fed the same diet but without the sensory compounds.

In further implementations, feeding sensory compounds with dry feed may result in reduced feed refusal and feed intake variation of dry feed. For example, young animals, such as weaning animals, may receive dry feed with sensory compounds and may exhibit a reduced feed refusal and feed intake variation of dry feed compared other young animals fed the same diet but without the sensory compounds.

In additional or alternative implementations, a young animal may receive milk replacer with sensory compounds for a portion of the MFP, and during weaning, may be offered milk replacer without sensory compounds in combination with dry feed combined with sensory compounds. In this implementation, the young animals receiving the sensory compounds may reduce feed refusal and feed intake variation of the feed components including sensory compounds compared to young animals fed the same diet but without the sensory compounds. For example, the young animals ingesting the sensory compounds may reduce feed refusal of milk replacer during the MFP compared to young animals fed the same diet but without the sensory compounds. During and after weaning, for example, the young animals ingesting the sensory compounds in the dry feed may reduce feed refusal and intake variation of dry feed, compared to young animals fed the same diet but without the sensory compounds. In this example, the reduced feed refusal of dry feed during weaning may be desirable when the animal is transitioning away from the weaning stage (i.e., transitioning away from a diet of liquid feed).

In yet further implementations, a young animal may receive sensory compounds simultaneously in milk replacer and dry feed. In this implementation, the young animal receiving the sensory compounds may reduce feed refusal of both milk replacer and dry feed compared to a young animal fed the same diet but without the sensory compounds.

In still further implementations, a young animal may receive sensory compounds in one or both of milk replacer and dry feed, but the amount of sensory compounds may be tapered or increased from one feed, and when fed in both feeds, the amount of sensory compounds in the other feed may be tapered, increased or may remain the same. For example, a young animal may be encouraged to reduce feed refusal of dry feed by adding sensory compounds or increasing the amount of sensory compounds in the dry feed. The young animal may exhibit a reduced feed refusal compared to a young animal fed the same diet but without the sensory compounds or with the sensory compounds at the initially administered level. In this example, milk replacer may not contain sensory compounds, or when sensory compounds are provided in milk replacer, the level of sensory compounds may remain the same, may be reduced, or may be increased. In another example, a young animal receiving sensory compounds in milk replacer may be encouraged to further reduce feed refusal of milk replacer by increasing the amount of sensory compounds in the milk replacer. In this example, the young animal may reduce feed refusal of milk replacer compared to a young animal fed the same diet but with the sensory compounds at the initially administered level. In a further example, a young animal, such as an animal experiencing distress (e.g., scours) may be encouraged to reduce feed refusal of one or both of milk replacer and dry feed, and the amount of sensory compounds may be increased in one or both types of feed.

Feeding young animals sensory compounds may reduce feed refusal as well as reduce weaning time, increase weight gain, improve feed efficiency, and combinations thereof, compared to animals receiving the same feed without sensory compounds. Further, feeding young animals sensory compounds may reduce feed variation across a group of young animals, which may enhance management's ability to satisfy housing, dietary and husbandry needs of the group of livestock animals.

Livestock animals that may be fed using the methods provided herein include ruminants such as cattle including dairy cows and steer; goats; or non-ruminants such as horses and pigs. Generally, the feeding methods and system provided are applicable to young livestock animals such as weaning, pre-weaned and recently weaned animals. In some implementations, companion animals may be provided sensory compounds for a reduced feed refusal. The young animals receiving sensory compounds during the MFP may generally range in age from 18 to about 120 days from birth. Weaning periods during the MFP may range from about 7 days to about 28 days in duration and may begin from about 24 to about 128 days from birth. The dry feed phase may last from about 25 days to about 129 days from birth.

Further, sensory compounds disclosed herein may provide additional benefits independent of formulation and feeding rate and may provide similar benefits in other situations where feed intake is limited such as in transition dairy cows, lactating sows, nursery piglets, and so on.

The following Examples provide implementations in which sensory compounds are provided to young animals, however, these Examples should not be construed as limiting.

Example 1

In this example, two products containing sensory compounds (e.g., botanical/essential oil products) were fed to calves via a standard all milk protein milk replacer (Nursing Formula™) composed of 22 percent protein and 20 percent fat, which is designed to be fed at 1.50 pounds daily on a dry weight basis. This amount of milk replacer powder was fed in two meals (0.75 pounds) daily after mixing into hot water. Bull calves in the trial were co-mingled and transported, and the trial lasted 42 days.

Two differently formulated, sensory compounds were fed using calf milk replacer in this study. Average weekly calf milk replacer consumption is presented in Table 1 below. Both sensory compounds resulted in reduced calf milk replacer refusal during all weeks of the six week trial (except for Digestarom® 1447 during the first week on test). During weeks one through five, a maximum of 10.50 pounds of calf milk replacer powder were fed. Calves fed sensory compounds consumed all of this offered calf milk replacer during several weeks of this trial. During week six, calves were fed only one meal daily (0.75 pounds of powder) as calves were conditioned for weaning from milk products. Even though the amount of calf milk replacer was halved during this week, control calves still had refused calf milk replacer, but the sensory compound-fed calves did not.

Procedures:

Sixty (60), three to ten day old Holstein bull calves from Wisconsin, weighing approximately 95-105 pounds were assigned by row, weight and initial gamma globulin level (equal distribution within each of following groups: <0.49, 0.50 to 0.99, 1.00 to 1.49, 1.50 to 2.49, and >2.5% gamma globulin) into groups of 20 calves. The first group was the control group and received a non-medicated calf milk replacer (Nursing Formula™). The second group received the same non-medicated calf milk replacer with a first sensory compound (Digestarom 1301® (Micro-Plus; Stadtoldendorf, Germany)) at 0.34 grams per day (0.17 grams per feeding) for the first 35 days of the trial and 0.17 grams per day for days 36-42. The sensory compound was hand mixed with the calf milk replacer at the time of rehydration at 0.05 weight percent of the weight of the feed. The third group received the same non-medicated calf milk replacer with a second sensory compound (Digestarom® 1447 AC (Micro-Plus; Stadtoldendorf, Germany)) at 1.63 grams per day (0.68 grams per feeding) for the first 35 days of the trial and 0.68 grams per day for days 36-42. The sensory compound for treatment 3 was hand mixed with the calf milk replacer at the time of rehydration at 0.20 weight percent of the total weight of the feed. The calves were offered 18 percent calf starters beginning at day 36 and extending through day 42 of the study.

Calves were weighed upon arrival and weekly thereafter. Other performance and parameters were determined on a daily basis and summarized by week and overall. Performance and scouring data were analyzed by general linear model ("GLM"). Data was reported as LSMEANS and separated by the PDIFF function of SAS.

Results:

Performance data are shown in Table 1.

TABLE 1

Performance of Calves fed milk replacer without and with either 1st Sensory compound or 2nd Sensory compound

| Item | Control CMR (NF) | CMR w/ 1st Sensory comp'd | CMR w/ 2nd Sensory comp'd | P-Values (P <= 0.20) | | | C.V. |
|---|---|---|---|---|---|---|---|
| | | | | 1 vs 2 | 1 vs 3 | 2 vs 3 | |
| Treatments | 1 | 2 | 3 | | | | |
| No. of Calves | 18 | 19 | 19 | | | | |
| Initial Wt., lbs. | 109.90 | 109.94 | 109.64 | — | — | — | 3.90 |
| Initial Ig$^D$ | 3.78 | 3.74 | 3.63 | — | — | — | 29.40 |
| Avg. Period Starter Intake, lbs. (DM Basis) | | | | | | | |
| Week 1 | 0.37$^a$ | 0.42$^a$ | 0.79$^b$ | — | <0.01 | 0.02 | 88.57 |
| 2 | 1.60 | 2.01 | 2.08 | — | — | — | 79.17 |
| 3 | 10.22 | 10.90 | 10.23 | — | — | — | 37.18 |
| 4 | 8.61 | 8.76 | 8.94 | — | — | — | 40.34 |
| 5 | 11.22 | 12.33 | 11.68 | — | — | — | 41.88 |
| 6 | 20.17 | 20.12 | 22.54 | — | 0.18 | 0.16 | 25.42 |
| Total | 52.19 | 54.53 | 56.26 | — | — | — | 29.38 |
| Avg. Period Gain, lbs. | | | | | | | |
| Week 1 | −0.79 | 1.34 | 1.33 | 0.10 | 0.11 | — | 612.67 |
| 2 | 3.38 | 5.35 | 5.23 | — | — | — | 100.71 |
| 3 | 8.18 | 7.88 | 8.55 | — | — | — | 45.87 |

TABLE 1-continued

Performance of Calves fed milk replacer without and with either 1st Sensory compound or 2nd Sensory compound

| Item | Control CMR (NF) | CMR w/ 1st Sensory comp'd | CMR w/ 2nd Sensory comp'd | P-Values (P <= 0.20) | | | C.V. |
|---|---|---|---|---|---|---|---|
| | | | | 1 vs 2 | 1 vs 3 | 2 vs 3 | |
| 4 | 11.18 | 12.88 | 12.17 | 0.12 | — | — | 27.70 |
| 5 | 10.91 | 12.22 | 11.46 | — | — | — | 35.34 |
| 6 | 12.60 | 13.59 | 13.39 | — | — | — | 37.21 |
| Total | 45.44 | 53.26 | 52.13 | 0.06 | 0.10 | — | 24.41 |
| Avg. Period Milk Replacer Consumption, lbs. (DM Basis) | | | | | | | |
| Week 1 | 8.82 | 9.40 | 8.59 | — | — | 0.11 | 17.32 |
| 2 | 9.65$^a$ | 10.34$^b$ | 10.28$^{ab}$ | 0.05 | 0.07 | — | 10.11 |
| 3 | 9.76 | 10.50 | 10.50 | 0.06 | 0.06 | — | 11.20 |
| 4 | 9.81 | 10.50 | 10.50 | 0.06 | 0.06 | — | 10.67 |
| 5 | 9.97 | 10.50 | 10.48 | 0.11 | 0.12 | — | 9.59 |
| 6 | 5.00 | 5.25 | 5.25 | — | — | — | 11.41 |
| Total | 53.01 | 56.49 | 55.59 | 0.06 | 0.15 | — | 9.85 |
| Feed Efficiency Avg. | 2.41 | 2.19 | 2.18 | 0.10 | 0.09 | — | 17.59 |

$^D$Gram - % as measured by Zinc Sulfate Turbidity and assigned to 1 of 5 ranges: 0.00-0.49, 0.50-0.99, 1.00-1.49, 1.50-2.49, and 2.50 or higher.
$^{ab}$p < 0.05

All calves were fed a fixed level (10.5 pounds DM, weekly) of milk replacer powder during weeks 1 through 5. The amount of milk replacer refused by calves weekly is the difference between milk replacer consumption and that offered (10.5 pounds DM, weekly). Reduced refusal of milk replacer powder by calves receiving sensory compounds was observed when both sensory compounds were fed. Coefficients of variation (C.V.) for milk replacer intake for the control, 1$^{st}$ sensory compound and the 2$^{nd}$ sensory compound were 9.27, 1.39 and 1.84 percent, respectively. Based on these values, sensory compounds meaningfully enhanced uniformity of milk replacer intake. The reduction of refusal and increased uniformity of milk replacer intake resulted in increased gain of sensory compound fed calves compared with controls. Calves receiving the first sensory compound gained 17.2 percent more than the control group (P=0.06). During period 2, calves receiving the first sensory compound reduced feed refusal (P<0.05) of milk replacer compared to the control group. Overall, calves receiving the 1$^{st}$ sensory compound had reduced milk replacer refusal compared with control fed calves (total intake of milk replacer was increased for 1st sensory compound, P=0.06). Calves receiving the 2$^{nd}$ sensory compound tended to have reduced milk replacer refusal compared with control fed calves (total milk replacer intake increased, P=0.15). The groups ingesting the sensory compounds in milk replacer had increased intake of starter feed and improved feed efficiency compared to the control group.

With respect to scour scores (e.g., severity of diarrhea) during period 2, e.g., the days of scouring during the period, the control group had higher (P<0.05) scour scores compared to calves receiving the first sensory compound. There were no differences (P>0.05) for average weeks 2 or 4 scour scores. During period 2, the control group had more (P<0.05) scour days compared to calves receiving the first sensory compound. There were no differences (P>0.05) for average weeks 2 or 4 scour days. Scour scores are based on a 1-4 scale, with 1=normal; 2=loose; 3=water separation; and 4=water separation with severe dehydration.

With respect to electrolyte and medication costs, during period 2, the control group had higher (P<0.05) electrolyte costs compared to calves receiving the first sensory compound. There were no differences (P>0.05) in total electrolyte costs. During period 5, calves receiving the second sensory compound had higher (P<0.05) medication costs compared to calves receiving the first sensory compound. There were no differences (P>0.05) in total medication costs. During period 2, calves in the control group had higher (P<0.05) combined electrolyte and medication costs compared to calves receiving the first sensory compound. During period 5, calves receiving the second sensory compound had higher (P<0.05) combined electrolyte and medication costs compared to calves receiving the first sensory compound. There were no differences (P>0.05) in total combined electrolyte and medication costs. In addition, there were no negative health responses noted by the animals ingesting the sensory compounds.

Summary:

Calves fed sensory compounds had reduced refusal and feed intake variation of calf milk replacer compared to the control group and exhibited an improved feed efficiency compared to the control group. This resulted in the calves gaining more weight compared to the control group. Both sensory compounds containing botanical and essential oil products appeared (P>0.05) to improve gain, efficiency and did not negatively impact the general health and well-being of the livestock animals in this trial.

Example 2

In view of the results of Example 1 that suggest sensory compounds produce benefits in gain, reduced feed refusal of calf milk replacer and starter, and without negatively impacting the general health and well-being of the livestock animals, a further study was conducted to determine whether improvement in feed refusal of calf milk replacer could be beneficial with alternative protein containing milk replacers. Alternative protein containing milk replacers are typically refused by calves to a greater degree (perhaps due to off flavor or amino acid profiles) and may result in increased feed refusal with decreased rate of weight gain. For example, by reducing refusal of alternative protein milk replacer by employing sensory compounds, the use of the alternative protein milk replacers for calves may be more viable. Given the benefits noted in the earlier trial, it was important to assess sensory compounds as an ingredient in an alternative protein milk replacer. In Example 2, the alternative protein was provided in the form of modified soy flour. Modified soy flour may be produced using the materials and methods described in U.S. Pat. No. 7,608,292, entitled "Method of processing soy protein," which is herein incorporated by reference in its entirety. In this trial, a first control group received traditional milk replacer, a second control group received the alternative protein milk replacer, and the test study group received the alternative protein milk replacer with sensory compounds. Calf milk replacer was fed at 1.50 pounds on a dry weight basis per day (two feedings). During the last week on test, calves received 0.75 pounds on a dry weight basis, daily in one feeding. Calves were sourced in the same manner as Example 1.

In this study, ten (10) calves were assigned to each treatment. Calf milk replacer was fed to all calves at a rate of 1.5 pounds per day. Calf starter having 20 percent protein was offered to all calves. The trial lasted 42 days.

Procedures:

Sixty (60), three to ten day old Holstein bull calves from Wisconsin, weighing approximately 80-95 pounds will be assigned by row, weight and initial gamma globulin level (equal distribution within each of following groups: <0.49, 0.50 to 0.99, 1.00 to 1.49, 1.50 to 2.49, and >2.5% gamma globulin) into groups of 10 calves. Thirty of the calves were observed for feed refusal response using a first control group of 10 calves receiving traditional calf milk replacer; a second control group of 10 calves receiving alternative protein containing milk replacers; and a test group of 10 calves receiving alternative protein containing milk replacers with sensory compounds (Digestarom® 1301, 0.05 weight percent) at a rate of 0.34 grams per day (0.17 grams per feeding per day) for the first 35 days of the trial, and 0.17 grams per day (single feeding) from days 36 through 42 of the trial. Specifically, calves were fed 0.75 pounds of non-medicated calf milk replacer twice per day (1.50 lbs/day) for days 1 through 35, then once a day (0.75 lbs/day) through day 42. Calves were offered starter during the trial.

Calves were weighed upon arrival and weekly thereafter. Other performance and parameters were determined on a daily basis and summarized by week and overall. Data was reported as LSMEANS and separated by the PDIFF function of SAS. Analysis of variance (ANOVA) P value (if <0.2) for all treatments is also listed.

Results:

Performance data are shown in Table 2.

TABLE 2

Performance of calves fed for the evaluation of various calf milk replacer (calf milk replacer main effect)

| CMR | Traditional Milk Replacer | Alternative protein milk replacer | Alternative protein with sensory compounds | SE | Main Effects (ANOVA)[D] |
|---|---|---|---|---|---|
| Total Starting Calves | 20 | 20 | 20 | | |
| Total Died | 2 | 2 | 1 | | |
| Total Removed +/− 2STD | 0 | 0 | 0 | | |
| Final Calves | 18 | 18 | 19 | | |
| Initial Ig[A] | 3.56 | 3.72 | 3.74 | 0.24 | — |
| Avg. Period milk replacer consumption, lbs. (DM Basis) | | | | | |
| Week 1 | 8.34 | 8.19 | 7.33 | 0.39 | .15 |
| Week 2 | 9.36 | 9.07 | 9.56 | 0.30 | — |
| Week 3 | 10.45b | 9.89a | 10.43b | 0.15 | .01 |
| Week 4 | 10.50b | 9.88a | 10.46b | 0.17 | .02 |
| Week 5 | 10.46b | 9.69a | 10.30b | 0.20 | .02 |
| Week 6 | 5.25b | 4.95a | 5.21b | 0.09 | .05 |
| Total CMR | 54.36 | 51.67 | 53.29 | 1.01 | .18 |
| Calf Weights, lbs | | | | | |
| Initial weight | 96.0 | 96.3 | 96.2 | 0.86 | — |
| Week[B] 1 | 97.0 | 94.7 | 95.7 | 1.34 | — |
| Week 2 | 101.9b | 97.4a | 97.7ab | 1.52 | .07 |
| Week 3 | 110.4b | 102.6a | 104.1a | 1.83 | .01 |
| Week 4 | 119.6b | 109.0a | 112.6a | 2.29 | .01 |
| Week 5 | 129.4b | 116.7a | 123.5ab | 2.75 | .01 |
| Week 6 | 141.9b | 127.9a | 135.7ab | 3.42 | .02 |
| Avg. Period Gain, lbs. | | | | | |
| Week 1 | 1.00 | −1.55 | −0.45 | 1.18 | — |
| Week 2 | 4.91b | 2.65ab | 1.94a | 0.84 | .04 |
| Week 3 | 8.54b | 5.27a | 6.40a | 0.73 | .01 |
| Week 4 | 9.12b | 6.37a | 8.57b | 0.75 | .03 |
| Week 5 | 9.86ab | 7.74a | 10.83b | 0.93 | .06 |
| Week 6 | 12.46 | 11.20 | 12.23 | 1.17 | — |
| Total Gain | 45.89b | 31.68a | 39.52ab | 3.39 | .02 |
| Period Dry Feed[C] consumption, lbs. (DM Basis) | | | | | |
| Week 1 | 0.44 | 0.50 | 0.51 | 0.08 | — |
| Week 2 | 2.19 | 1.83 | 2.07 | 0.26 | — |
| Week 3 | 4.72 | 3.58 | 3.79 | 0.50 | — |

TABLE 2-continued

Performance of calves fed for the evaluation of various calf milk replacer (calf milk replacer main effect)

| CMR | Traditional Milk Replacer | Alternative protein milk replacer | Alternative protein with sensory compounds | SE | Main Effects (ANOVA)[D] |
|---|---|---|---|---|---|
| Week 4 | 7.04 | 5.11 | 6.54 | 0.69 | .13 |
| Week 5 | 9.53 | 8.17 | 9.85 | 0.98 | — |
| Week 6 | 17.37 | 14.46 | 17.25 | 1.36 | — |
| Total Dry Feed Cons. | 41.28 | 33.65 | 40.01 | 3.51 | — |
| Average Feed: Gain | 2.38 | 2.82 | 2.63 | 0.22 | — |

Means in the same row not followed by a common letter differ (P < .05) using LSD procedure.
[A]Gram - % as measured by Zinc Sulfate Turbidity and assigned to 1 of 5 ranges: 0.00-0.49, 0.50-0.99, 1.00-1.49, 1.50-2.49, and 2.50 or higher.
[B]Seven day duration.
[C]Ampli-Calf 20 B60, Willmar, MN.
[D]P value comparing main effects.
[a,b]P < 0.05 (paired comparison).

Compared to calves offered alternative protein milk replacer without sensory compounds, calves offered the alternative milk replacer with sensory compounds had reduced refusal of milk replacer (10.5 pounds of milk replacer DM offered weekly during weeks 1-5). Coefficients of variation for milk replacer consumption for the alternative protein without and with sensory compounds were 6.88 and 2.7 percent, respectively. This reduction in refusal and intake coefficients of variation resulted in increased weight, increased weight gain, increased dry feed intake, and improved feed efficiency. Compared to calves offered traditional milk replacer, calves offered the alternative milk replacer with sensory compounds showed similar end weights, weight gain rates, and feed refusals.

Overall, calves offered traditional milk replacer and the alternative protein milk replacer with sensory compounds, had higher (P<0.05) total respiratory scores than calves offered the alternative protein milk replacer without sensory compounds. With respect to weaning, based on Land O' Lakes Criteria, by day 35 more (P<0.05) calves offered the alternative protein milk replacer with sensory compounds could have been weaned compared to calves offered the alternative protein milk replacer without sensory compounds. According to the Land O' Lakes criteria, a calf is assumed weaned when 1.0 lb of dry feed consumed each day for 2 consecutive days.

With respect to weaning using Land O' Lakes Criteria, by day 35 more (P<0.05) calves receiving treatment with the sensory compounds could have been weaned compared to calves receiving treatments without the sensory compounds. Using industry criteria, in which a calf is assumed weaned when 1.5 lbs dry feed consumed each day for 3 consecutive days, by day 28 more (P<0.05) calves receiving treatment with sensory compounds could have been weaned compared to calves receiving control treatments.

There were no differences (P>0.05) between the test groups in weekly or average 2-week scour scores; weekly or average 2-week scour days; electrolyte costs; medication costs; total combined electrolyte and medication costs; and attitude scores. In addition, there were no negative health responses noted by the animals ingesting the sensory compounds.

Summary:

Calf milk replacer refusal was reduced for all periods (except for period 1) when sensory compounds were added. Reduced calf milk replacer refusal and enhanced uniformity of milk replacer intake resulted in measurable increases in starter feed consumption and body weight gain. Further, these benefits were observed without negative impacts to the general health of the young livestock animals. Sensory compounds appear to reduce refusal and feed intake variation of alternative protein calf milk replacer and performance of calves. The sensory compounds delivered remarkably consistent results.

Example 3

In this Example, sensory compounds were included in a milk replacer that was designed to be fed at a higher feeding rate. Calf milk replacer was fed at a 1.8 pound feeding rate on a dry weight basis through day seven. From days 8 through 42, calves were fed 2.5 pounds of calf milk replacer powder on a dry weight basis. During these periods, calf milk replacer was fed in two equal feedings after being hydrated with water. During the last week (days 42 through 49), calves received only one calf milk replacer feeding (1.25 pounds of powder). Calves were sourced in the same manner as Example 1. Milk replacers of interest in this trial contained 27 percent protein and either 10 percent or 15 percent fat. Eighteen (18) calves were assigned to each treatment. All calves were offered calf starter and the trial lasted 49 days.

Procedures:

Seventy-two (72), 3-10 day old, Holstein bull calves from Wisconsin, weighing approximately 95-110 pounds were assigned, by weight and initial gamma globulin level (equal distribution within each of following groups: <0.49, 0.50 to 0.99, 1.00 to 1.49, 1.50 to 2.49, and >2.5% gamma globulin) to two treatments. The first treatment received all milk protein, milk replacer with 27 percent protein formulated to a fatty acid standard and the second treatment received the same milk replacer with the sensory compound.

From days 1 through 7 of the trial, calves receiving milk replacer with sensory compounds were provided 0.41 grams per day (0.20 grams for at first feeding and 0.21 grams at a second feeding). From days 8 through 42, calves receiving sensory compounds were provided 0.57 grams per day (0.28 grams for each of the two feedings). From days 43 through 49, calves receiving sensory compounds were provided 0.28 grams per day, which was provided in a single feeding.

Calves were weighed upon arrival and weekly thereafter. Other performance parameters were determined on a daily basis and summarized by week and overall. Performance and scouring data were analyzed by GLM. Data was reported as LSMEANS and separated by the PDIFF function of SAS.

Results:

Performance data showing the main effects of sensory compounds added to milk replacer are shown in Table 3.

TABLE 3

Effects of Sensory Compounds

| Additives | Diet Descriptions | | SE | (1) |
|---|---|---|---|---|
| | Milk Replacer | Milk replacer with Sensory Compound | | |
| Total Starting Calves | 36 | 36 | | |
| Total Died | 3 | 6 | | |
| Total Removed +/−2STD | 0 | 0 | | |
| Final Calves | 33 | 30 | | |
| Avg. Period MR Consumption, lbs. (DM Basis) | | | | |
| Week 1 | 10.09 | 10.31 | 0.32 | — |
| Week 2 | 14.45 | 15.49 | 0.57 | — |
| Week 3 | 15.36 | 16.54 | 0.47 | .08 |
| Week 4 | 16.11a | 17.37b | 0.35 | .01 |
| Week 5 | 16.28 | 17.10 | 0.37 | .12 |
| Week 6 | 16.53 | 17.22 | 0.29 | .09 |
| Week 7 | 8.75 | 8.75 | — | |
| Total CMR | 97.6a | 102.8b | 1.73 | .04 |
| Initial Weight, lbs | 104.9 | 105.6 | 0.99 | — |
| Weight wk 1, lbs | 110.5 | 109.8 | 0.68 | — |
| Weight wk 2, lbs | 121.6 | 121.2 | 1.39 | — |
| Weight wk 3, lbs | 130.2 | 131.8 | 1.70 | — |
| Weight wk 4, lbs | 139.9 | 143.7 | 2.03 | .19 |
| Weight wk 5, lbs | 151.1 | 155.3 | 2.35 | — |
| Weight wk 6, lbs | 163.3 | 167.9 | .03 | — |
| Weight Wk 7, lbs | 173.1 | 178.4 | 3.94 | — |
| Avg. Period Gain, lbs. | | | | |
| Week 1 | 5.31 | 4.59 | 0.68 | — |
| Week 2 | 11.03 | 11.41 | 0.95 | — |
| Week 3 | 8.63 | 10.54 | 0.75 | .08 |
| Week 4 | 9.74a | 11.96b | 0.73 | .04 |
| Week 5 | 11.15 | 11.57 | 1.06 | — |
| Week 6 | 12.23 | 12.62 | 1.17 | — |
| Week 7 | 9.76 | 10.54 | 1.21 | — |
| Total Gain | 67.85 | 73.23 | 3.94 | — |
| Period Dry Feed Consumption, lbs. (DM Basis) | | | | |
| Week 1 | 0.55 | 0.37 | 0.07 | .09 |
| Week 2 | 1.51 | 1.03 | 0.20 | .09 |
| Week 3 | 2.21 | 1.71 | 0.27 | .19 |
| Week 4 | 2.89 | 3.04 | 0.39 | — |
| Week 5 | 4.56 | 4.28 | 0.54 | — |
| Week 6 | 6.36 | 7.00 | 0.78 | — |
| Week 7 | 13.67 | 15.24 | 1.42 | — |
| Total Dry Feed Cons. | 31.75 | 32.67 | 3.38 | — |
| Average Feed: Gain | 2.05 | 1.92 | 0.07 | — |

PR > F if <.20 for (1) Additives
Means in the same row not followed by a common letter differ (P < .05) using LSD procedure.

During week one, a total of 12.6 pounds of calf milk replacer powder was offered and, calves fed sensory compounds reduced feed refusal and consumed 10.31 pounds of this total compared to 10.09 for the control animals. During weeks two through six, a total 17.5 pounds of powder was fed weekly to calves. Sensory compound-fed calves reduced feed refusal of this total every week. During the final week of this evaluation, 1.25 pounds of powder were offered per day. Only during this week of weaning were refusals similar.

CVs for milk replacer consumption were 12.23 and 5.49 percent for the control and that with sensory compounds, respectively.

Overall, calves receiving sensory compounds in the milk replacers weighed more, gained more weight, reduced refusal of (P<0.05) calf milk replacer and of starter feed and had an improved feed to gain ratio than treatments where calves were fed the same milk replacer but without sensory compounds for the seven week period.

Hip Height, Heart Girth, Body Length and Body Volume: Calves receiving sensory compounds had increased (P<0.05) seven week hip height gain compared to the control group. Calves receiving sensory compounds had increased (P<0.05) seven week heart girth gain compared to the control group. Calves receiving sensory compounds had increased (P<0.05) seven week body volume gain compared to the control group.

With respect to electrolyte and medication costs, the control group had higher electrolyte costs, medication costs and combined electrolyte and medication costs compared to calves ingesting the sensory compound. There were no negative health responses noted by the animals ingesting the sensory compounds.

Summary:

Use of sensory compounds again reduced milk replacer refusal and improved uniformity of milk replacer intake. The reduction in milk replacer refusal and feed intake variation included enhancements in total gain, starter intake, feed efficiency and body measurements. Coefficients of variation for milk replacer intake were also reduced for the milk replacer containing sensory compounds suggesting sensory compounds reduces refusal and intake variation in situations where full potential rates of milk replacer dry matter is offered. Again, calves with reduced refusal, appear to gain more weight and consume more starter feed.

Example 4

In addition to an evaluation of different milk replacer treatments, the benefits of sensory compounds in calf starter were assessed. A traditional calf milk replacer (Nursing Formula™ (22:20)) was employed as the base milk replacer. All calf starter treatments were split with half of the calves assigned to the control 20 percent protein calf starter (Ampli-Calf® 20) and the other half to this same product with added sensory compounds at 0.05 weight percent of the total weight of the feed (e.g., 500 grams of sensory compound per ton of dry feed). Calves were again sourced as in Example 1. The composition of the starter feed ingested by the animals is provided in Table 4.

TABLE 4

Starter Feed Component

| | Percent |
|---|---|
| Corn | 36.6 |
| Dehulled Soybean Meal | 30.3 |
| Wheat Middlings | 8.5 |
| Oats | 8.0 |
| Molasses and fat mixture | 4.5 |
| Ground Cotton Seed Hulls | 4.0 |
| Distillers Grains | 3.0 |
| Calcium Carbonate | 2.0 |
| Molasses | 1.5 |

TABLE 4-continued

Starter Feed Component

| | Percent |
|---|---|
| Salt | 0.5 |
| Other Macronutrients and Micronutrients | 1.1 |
| Total | 100 |

The nutrient composition of the starter feed is provided in Table 5.

TABLE 5

Starter Feed Nutrients

| | Percent |
|---|---|
| Coarse ingredients (e.g., corn, soy, oats) | 49.9 |
| Distillers Grains | 3.0 |
| Molasses | 6.0 |
| Calcium | 1.0 |
| Salt | 0.5 |
| Protein | 20.0 |
| Fat | 2.5 |
| NIR Fiber | 5.7 |
| Acid Detergent Fiber | 7.0 |
| Starch | 27.2 |

Feed refusal for the first six weeks during the trial is shown in Table 6. The offered amounts are on a per week basis. Thus, for example, the animal offered 0.76 pounds of dry feed during the Week 1 in Table 6 below is offered 0.101 pounds of dry feed per day.

TABLE 6

Weekly Feed Refusal Summary (per calf basis)

| | Diet | Diet A | Diet A with Sensory compounds |
|---|---|---|---|
| Week 1 | Offered, lbs. | 0.82 | 0.76 |
| | Refused, lbs. | 0.38 | 0.36 |
| | Intake | 0.439 | 0.392 |
| | % Refusal* | 56.31% | 61.05% |
| | % Refusal** | 46.34% | 47.37% |
| Week 2 | Offered, lbs. | 2.04 | 2.32 |
| | Refused, lbs. | 0.29 | 0.22 |
| | Intake | 1.76 | 2.10 |
| | % Refusal* | 24.02% | 14.38% |
| | % Refusal** | 14.22% | 9.48% |
| Week 3 | Offered, lbs. | 2.9 | 3.82 |
| | Refused, lbs. | 0.05 | 0.05 |
| | Intake | 2.85 | 3.77 |
| | % Refusal* | 2.98% | 2.47% |
| | % Refusal** | 1.72% | 1.31% |
| Week 4 | Offered, lbs. | 6.59 | 8.05 |
| | Refused, lbs. | 0.34 | 0.33 |
| | Intake | 6.25 | 7.72 |
| | % Refusal* | 7.93% | 5.24% |
| | % Refusal** | 5.16% | 4.10% |
| Week 5 | Offered, lbs. | 8.58 | 10.82 |
| | Refused, lbs. | 0.11 | 0.03 |
| | Intake | 8.46 | 10.79 |
| | % Refusal* | 4.15% | 0.35% |
| | % Refusal** | 1.28% | 0.28% |
| Week 6 | Offered, lbs. | 16.62 | 20.32 |
| | Refused, lbs. | 0.37 | 0.42 |
| | Intake | 16.25 | 19.90 |
| | % Refusal* | 3.63% | 2.15% |
| | % Refusal** | 2.23% | 2.07% |

TABLE 6-continued

Weekly Feed Refusal Summary (per calf basis)

| | Diet | Diet A | Diet A with Sensory compounds |
|---|---|---|---|
| Weeks 1-6 | Offered, lbs. | 37.56 | 46.09 |
| | Refused, lbs. | 1.54 | 1.41 |
| | Intake | 36.01 | 44.68 |
| | % Refusal* | 6.51% | 3.69% |
| | % Refusal** | 4.11% | 3.07% |

Refusal* = Average of each animals refusal percent
Refusal** = Avg Refused/Avg Offered Steps in calculating refusal values in Table 8 included the following: 1. Calculate total feed added to pails (FI) on an As-fed basis; 2. Calculate daily WB (total feed removed from pails that was weighed out and replaced); 3. Convert the daily WB to the same dry matter as the fresh feed as follows: (WB DM/FI DM)*Daily WB; 4. Subtract adjusted daily WB from FI to get the adjusted FI value; 5. Convert the weekly feed out (FO) to same dry matter as the FI as above; 6. Calculate refusal as follows: Adj FO/Adj FI; and 7. Subtract adjusted FO from adjusted FI to get the adjusted Feed Offered value. Coefficients of variation for starter intake by calves were 50.19 and 43.59 percent for the starter without and that with sensory compounds, respectively.

Summary:

Starter feed refusal was reduced every week except for week one (starter feed intake during the first week is so small that this data is generally not that informative). These data were surprising and again point to the merit of sensory compounds. Coefficients of variation for starter intake were also reduced for starter containing sensory compounds.

As used herein, standard error ("SE") is the standard deviations of the sample in a frequency distribution, obtained by dividing the standard deviation by the total number of cases in the frequency distribution. A coefficient of variation ("C.V.") for data is the standard deviation of a particular variable divided by the mean of the variable and then multiplied by 100. "P" used in the Tables above is a probability value. For purposes of comparing data in this document, P values of 0.05, or lower, are considered to be statistically significant.

Although the present disclosure provides references to preferred embodiments, persons skilled in the art will recognize that changes may be made in form and detail without departing from the spirit and scope of the invention.

What is claimed is:

1. A method of feeding a young animal, the method comprising:
    mixing sensory compounds with a milk replacer, wherein the sensory compounds comprise licorice, the licorice accounting for at least about 60 percent of the sensory compounds; and
    providing the mixture to the young animal, wherein the sensory compounds are consumed at a rate of at least about 0.17 grams per feeding in up to 1.25 pounds of milk replacer on a dry basis per feeding;
    wherein the animal reduces its feed refusal of the milk replacer compared to other young animals fed the same milk replacer but without the sensory compounds.

2. The method of claim 1, wherein the young animal ingests the sensory compounds in the milk replacer at a rate of up to about 11.50 grams per day.

3. The method of claim 2, wherein the milk replacer is fed at a rate of at least about 0.75 pounds on a dry basis per day per animal.

4. The method of claim 2, wherein the milk replacer is fed at a rate of at least about 0.75 pounds on a dry basis per day per animal and up to about 2.5 pounds on a dry basis per day per animal.

5. The method of claim 1, wherein the young animal ingests dry feed mixed with the sensory compounds up to about 5.30 grams per day.

6. The method of claim 1, wherein the young animal ingests at least about 0.34 grams of sensory compounds per day in the milk replacer for a first time period and ingests a reduced amount of sensory compounds per day in the milk replacer for a second time period following the first time period.

7. The method of claim 6, wherein the first time period is at least about 28 days.

8. The method of claim 7, wherein the second time period is about 7 days.

9. The method of claim 8, wherein the reduced amount of sensory compounds comprises at least about 0.17 grams per day.

10. The method of claim 9, wherein the young animal ingests dry feed at least during the second time period.

11. The method of claim 10, wherein dry feed comprises sensory compounds.

12. The method of claim 1, wherein the young animal is a pre-weaned or a recently weaned animal.

13. The method of claim 1, wherein the sensory compounds further comprise vanillin.

14. A method of reducing feed variation in a group of young animals, the method comprising: feeding the group of young animals an effective amount of sensory compounds comprising a licorice root sensory compound in a milk replacer such that the young animals reduce their feed variation compared to a group of young animals fed the milk replacer without the sensory compounds,
wherein the licorice root sensory compound accounts for at least about 60 percent of the sensory compounds, and the sensory compounds are consumed at a rate of at least about 0.17 grams per animal per feeding in up to 1.25 pounds of milk replacer on a dry basis per animal per feeding.

15. The method of claim 14, wherein the sensory compounds further comprise vanillin.

16. The method of claim 14, wherein the milk replacer is fed at a rate of at least about 0.75 pounds on a dry basis per day per animal.

17. The method of claim 14, wherein the young animals ingest dry feed mixed with the sensory compounds up to about 5.30 grams per day per animal.

18. The method of claim 17, wherein the young animal ingesting the sensory compounds exhibits an increased rate of weight gain compared to the young animal fed dry feed without the sensory compounds.

* * * * *

UNITED STATES PATENT AND TRADEMARK OFFICE
CERTIFICATE OF CORRECTION

PATENT NO. : 9,668,500 B2  
APPLICATION NO. : 13/837693  
DATED : June 6, 2017  
INVENTOR(S) : Bill L. Miller Page 1 of 1

It is certified that error appears in the above-identified patent and that said Letters Patent is hereby corrected as shown below:

In the Specification

| Column | Line | | Should Be |
|---|---|---|---|
| 7 | 33 | "Two differently formulated, sensory" | -- Two differently formulated sensory -- |

Signed and Sealed this  
Thirty-first Day of October, 2017

Joseph Matal  
*Performing the Functions and Duties of the  
Under Secretary of Commerce for Intellectual Property and  
Director of the United States Patent and Trademark Office*